May 20, 1958 J. R. DAY 2,835,800

DIVERSITY RECEIVING SYSTEM

Filed Nov. 14, 1955 2 Sheets-Sheet 1

INVENTOR.
James R. Day
BY
Moser Nolte Crews & Berry
ATTORNEYS

INVENTOR.
James R. Day

BY

Moser, Nolte, Crews & Berry
ATTORNEYS 2,835,800

DIVERSITY RECEIVING SYSTEM

James R. Day, Peconic, N. Y.

Application November 14, 1955, Serial No. 546,618

15 Claims. (Cl. 250—20)

The present invention relates to a diversity receiving system and particularly to a system of this type applicable to F. M. reception.

The advantages of diversity reception have been known for a long time. In diversity reception, advantage is taken of the fact that the signals at two separate receiving sites or two separate frequencies only infrequently fade at the same time. For this reason, it is possible to materially improve the reliability of reception if a way can be found to either combine the two signals so as to keep their sum at an optimum value or to select between them, always selecting the better signals as their ratio varies. While this has been done for A. M. reception, and it is very desirable to accomplish the same results in F. M. reception, there has, to my knowledge, been no satisfactory method or system proposed or proven in use for F. M. diversity reception.

It has been discovered lately that radio frequency signals of the frequency of 100 megacycles or more, are far more useful well beyond the horizon than had previously been supposed. Reception beyond the horizon is due to scatter propagation, which is peculiarly subject to fading which is rapid although not generally very great. In other words, the signal level well beyond the horizon has a much better average value than had been expected but is subject to continuous small fluctuations that seriously interfere with the reliability of reception. Consequently diversity reception of scatter propagation is very desirable.

In an F. M. system the output of the receiver is always constant when the radio signal is above a threshold value due to the inherent limiting in the receiver. The modulation output of the receiver is always accompanied by noise, the amplitude of which is inversely proportional to that of the radio frequency signal being received. Thus, a small radio frequency signal will cause a high level of noise in the receiver output and a large radio frequency signal will cause a low level of noise, the relationship between the noise and the amplitude of the radio frequency signal being linear. This relationship is utilized in the present invention to achieve an optimum combination of the signal outputs of the receivers in a manner which will be described in detail hereinafter.

Another characteristic of the signals to be combined which is utilized by the present invention is that the modulation component of the several receivers can be made substantially equal in amplitude and phase by limiting in F. M. receivers and by A. G. C. circuits in A. M. receivers, whereas the noise outputs of the several receivers are independent or uncorrelated, at least in the case of thermal noise, which is the most important case. This characteristic is utilized in the present invention by supplying the outputs of the receivers to a combining circuit which produces a modulation voltage output equal to the sum of the modulation voltages of the several receivers, but which produces a noise voltage output which is equal to the R. M. S. value of the receiver noise outputs. As a result, a gain in the signal to noise power ratio is obtained equal to the number of receivers used.

It is an object of the present invention to provide an improved diversity reception system.

It is another object of the invention to provide a diversity reception system for F. M. signals.

It is another object of the invention to provide a plurality of receivers for diversity reception, each of which has a noise output inversely proportional to the amplitude of the received radio frequency signal and to combine the signal outputs of the receivers while varying the output of each receiver inversely in accordance with the noise output of said receiver.

It is a further object of the invention to provide a combining circuit for a diversity receiving system in which the signal to noise ratio is not impaired substantially when the signals impressed by the receivers on the combining circuit become unequal.

The foregoing objects and advantages and others are obtained according to the invention in a manner which will be fully understood from the following description and the drawing in which.

Figure 1:
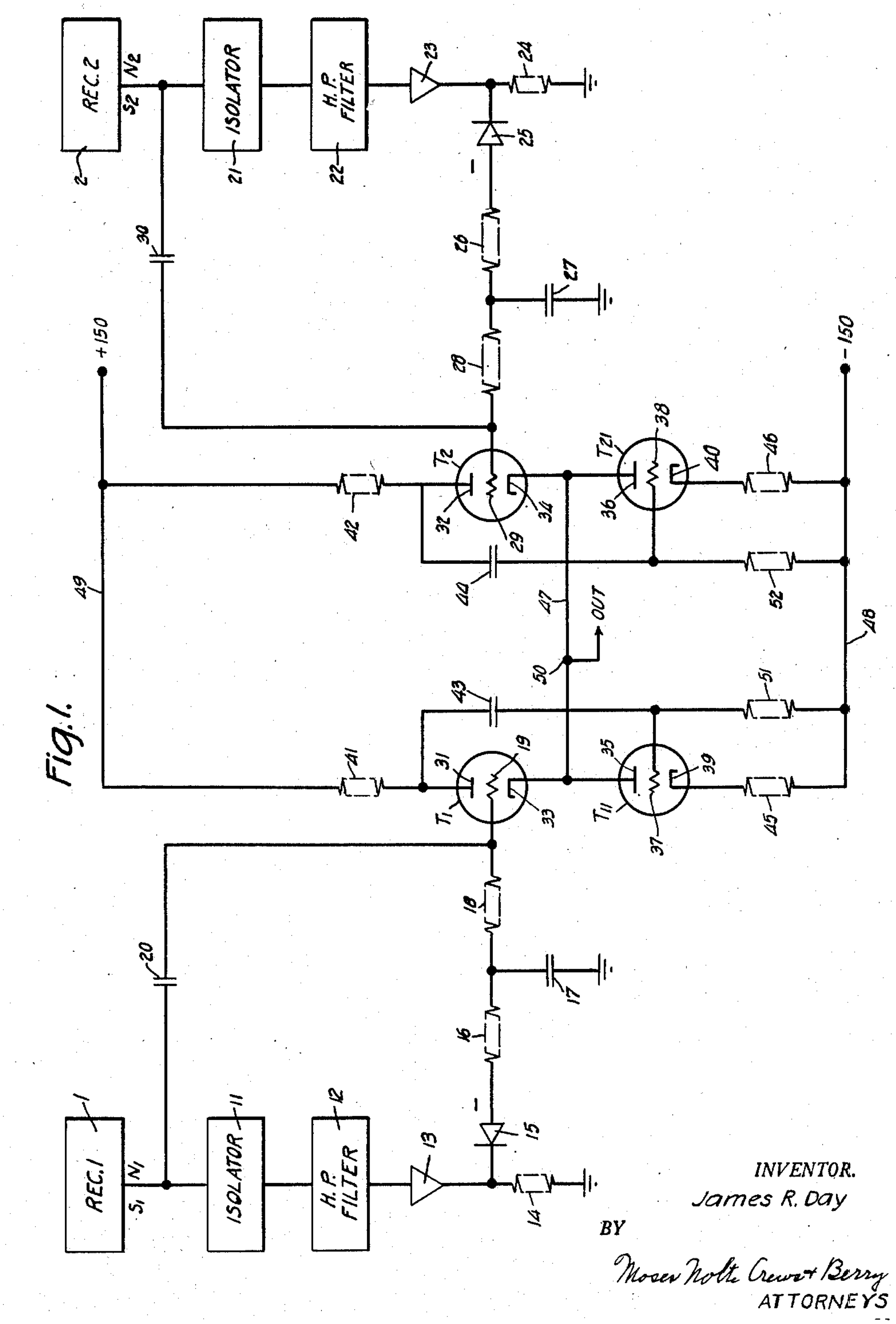
Fig. 1 is a circuit diagram of one embodiment of the invention.

Referring to Fig. 1, there is shown a pair of diversity receivers 1 and 2 which may be spaced from each other, or may operate at different frequencies, or may be connected to antennas at different locations to provide diversity reception. There may, of course, be any number of such receivers each connected in the manner to be described hereinafter but for the sake of simplicity of explanation, the invention will be described with reference to only two receivers. The receivers are of the type which produce an output consisting of signals S1 and S2 which normally have substantially equal amplitudes and are correlated or coherent in the sense that they vary in the same manner at the same time. Receivers 1 and 2 also have noise outputs N1 and N2 respectively. When the received signals at receivers 1 and 2 are of equal amplitude, the noise output N1 and N2 are also equal, provided the receivers are identical. When the received signals at the two receivers are not equal, the noise outputs are unequal and inversely proportional to the amplitude of the received signals. Receivers having these characteristics are F. M. receivers having limiters and receivers having automatic gain control. The output of receiver 1 is connected to a high pass filter 12 preferably through an isolating electron tube 11. If for the sake of definiteness, it is assumed that the modulation frequencies in the system extend from 200 cycles per second to 200 kilocycles per second, the high pass filter 12 may have a cut-off frequency of about 300 kilocycles per second, which is above the useful modulation frequency. The output of filter 12 therefore contains no modulation frequency but consists only of the noise signal N1. It is understood of course, that these modulation and noise frequencies are supplied to filter 12 by virtue of the fact that the receiver output consists of the demodulated signal and noise output S1 and N1, as indicated in Fig. 1. This noise signal is fed through an amplifier 13 across a load resistor 14. The noise signal N1 impressed across resistor 14 is rectified by the rectifier 15 which is polled so as to provide a negative bias for the control grid 19 of tube T1. The negative bias is applied to the control grid through a filter circuit consisting of a resistor 16, a condenser 17 and an isolating resistor 18. The signal and noise frequencies S1 and N1 are fed to the control grid of tube T1 through a condenser 20.

In a similar manner the output of receiver 2 is fed through a high pass filter connected to the output of the receiver preferably by an isolating electron tube 21. The output of the high pass filter is then amplified by amplifier 23 and impressed across the load resistor 24, to which a rectifier 25 is connected for developing a negative bias voltage. The bias voltage is filtered by the resistor 26, by-pass condenser 27 and then impressed on the control grid 29 of tube T2 through the isolating resistor 28. Both the signal output S2 and the noise output N2 of receiver 2 are fed through condenser 30 to the control grid of tube T2.

The cathode of tube T1 is connected to the anode 35 of tube T11 and the cathode 34 of tube T2 is similarly connected to the anode 36 of tube T21. The cathodes 39 and 40 of tubes T11 and T21 are connected through resistors 45 and 46 to lead 48, which may be maintained at a suitable negative voltage such as −150 volts. The anodes 31 and 32 of tubes T1 and T2 are connected through resistors 41 and 42, respectively, to lead 49 which may be at +150 volts. The cathodes 33 and 34 have a direct connection 47 therebetween. The output developed by tube T1 across the resistor 41 is fed through condenser 43 to the grid 37 of tube T11 and the output of tube T2 developed across the resistor 42 is fed through the condenser 44 to the grid 38 of tube T21. Grids 37 and 38 are connected to lead 48 through grid leaks 51 and 52. The output is taken from the common cathode terminal 50. It can be seen then that tubes T11 and T21 form the load for the tubes T1 and T2, which load is provided by the resistor 35 in my copending application, Serial No. 517,851, filed June 24, 1955. Each vertical pair of tubes, for example, tubes T1 and T11, are so connected that the output of T11, after being transmitted through tube T1, is returned as an input signal for tube T11. This, in effect, is a form of negative feedback and causes the effective resistance of tube T11 to vary in accordance with the input signal. The same effect, of course, occurs in tube T21.

Figure 2:
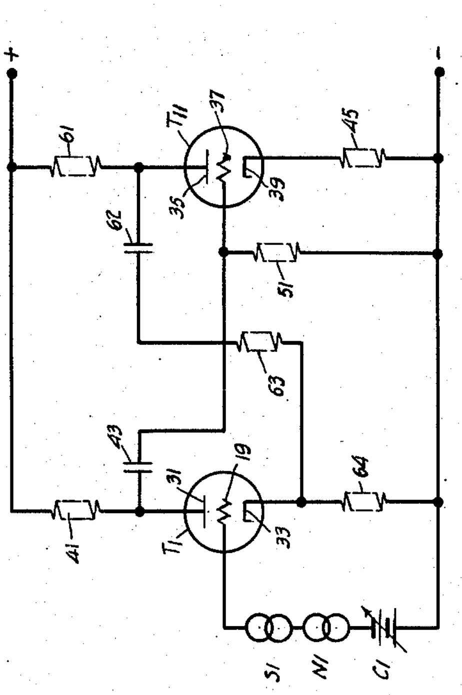
Fig. 2 is a circuit diagram showing the manner in which negative feedback is produced in the combining circuit.

The manner in which negative feedback is produced may be understood from a consideration of the circuit shown in Fig. 2. The voltages applied to the grid 19 of tube T1 are here indicated as being supplied by a generator producing an input signal S1; another generator producing a noise voltage N1 and a source of variable bias C1. It will be seen at once that the tubes T1 and T11 are connected as a two-stage resistance coupled amplifier having a negative feedback connection 62, 63 from the anode of tube T11 to the cathode of tube T1. If the resistor 63 is made vanishingly small, substantially the entire output of tube T11 is coupled back to tube T1. In other words, unity feedback is provided. The anode of tube T11 is then directly connected to the cathode of tube T1 so far as A. C. voltages are concerned. The resistors 61 and 64 are then effectively connected in parallel to ground. If, now, the A. C. connections are arranged so that the D. C. operating requirements are satisfied for tubes T1 and T11 without using the blocking condenser 62, it is apparent that resistors 61 and 64 can be omitted and the circuit of tubes T1 and T11 of Fig. 1 results. This analysis shows, therefore, that the vertical arrangement of tubes T1 and T11 and tubes T2 and T21 are, in effect, feedback circuits with a unity feedback factor. By this is meant that the entire output of the tandem amplifier is fed back to its input.

An important feature of the present combining circuit is that, whereas tubes T11 and T21 of Fig. 1 are connected in parallel, because of the common cathode connection 47, the feedback for each vertical pair of tubes is derived only from the currents in those tubes.

In order to insure that the useful signals S1 and S2 shall arrive at the tubes T1 and T2 substantially in the same phase, the electrical distances from the antennas to these tubes are equalized.

The operation of the circuit as so far described will now be explained.

The tubes T1 and T2 together with their loads 41 and 42, the impedances of which may be small compared to the tube impedances, may be considered as two sources with their outputs tied in parallel. The load for one, then, is the impedance looking back into the other. If we take the case of two tubes and assume the control voltages are momentarily each zero, and the signals equal and coherent, the grids will then be executing coherent excursions, and considered individually the cathodes potentials will be varying in the same manner and, therefore, will present no loading one to the other. Thus, although tube T1 and resistor 41 are physically connected in parallel with tube T2 and resistor 42, each tube operates without loading by the other. This will be true only when the signals on the grids are coherent, i. e., vary in the same phase.

Figure 3:
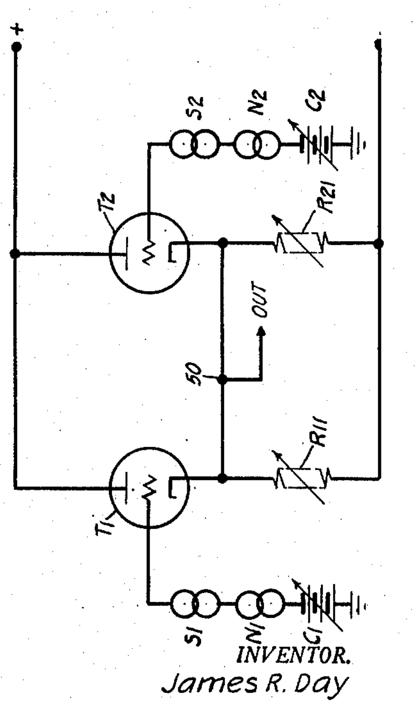
Fig. 3 is a simplified circuit diagram for the purposes of illustrating the principles of the combining circuit.

Fig. 3 shows in simplified form the circuit of tubes T1 and T2 of Fig. 1, having voltage sources S1, N1 and C1 and S2, N2 and C2 connected to their control grids, where C1 and C2 represent the bias voltages, N1 and N2 represent the noise voltages, and S1 and S2 represent the signal voltages. For the moment, let us imagine that the inputs are two identical signals S. Tubes T11 and T12 are represented by equivalent resistances R11 and R21. Since, as explained before, there is no impediment of one output to the other, and since cathode followers have a gain of nearly unity, a signal substantially equal to S will appear at the common cathode terminal 50. If, now, one of the signals, say S2, equals zero, the cathode of tube T2 does not follow a signal on its grid. Tube T2 then opposes or forms a load for the variations of the cathode voltage of T1 in response to the signal S1 on the grid of tube T1. Since the internal resistances of these two cathode followers, which for the purposes of analysis may be considered as including resistors 41 and 42, are practically equal, we now have the case of a generator, namely, tube T1, loaded by a load equal in magnitude to its own internal impedance. This has the effect of cutting the output voltage in half, as compared to the open circuit voltage. This is essentially the action of all the individual uncorrelated noise components N1 and N2, that is to say, the gain of the combiner stage consisting of tubes T1 and T2 is one-half to each of the separate noise inputs, whereas it is unity to the two equal signal inputs. Now, since the noise power output is the root mean square of the noise components, the noise will be the square root of the sum of the squares of the noise amplitudes halved, or $$N_s=\sqrt{\left(\frac{N1}{2}\right)^2+\left(\frac{N2}{2}\right)^2}$$

while the output will be S for the signal. As stated previously, when N1 happens to equal N2, which occurs for equal radio signals, there will be an improvement in the output signal to noise power ratio of 2 to 1. If three signals are combined, under the same assumptions, the gain in power in the combined signal to noise ratio would be three-fold instead of two-fold, and for four signals the gain would be four-fold, etc.

Now consider the combining action when the noise outputs of the two receivers are not equal. To illustrate this, assume that momentarily receiver 1 has a good signal and receiver 2 has a poor signal. In this case N1 will be smaller than N2. If tubes T1 and T2 were not differently biased, the output sum, so far as noise is concerned, would be the root mean square sum of the normal N1 and the greater N2, and since the signals are equal, this would mean a deterioration in the combined output. But now the bias or control voltage C2 for tube T2 is more negative than bias voltage C1 for tube T1.

This will bias tube T2 in a direction to decrease its direct current output, and lower its transconductance, which in turn increases its internal impedance as a generator. The effect of this effective impedance change is to decrease the noise output of tube T2.

Thus, it can be seen that by suitably proportioning the amplifications of amplifiers 13 and 23, and adjusting the operating conditions of tubes T1 and T2, it is possible to differentially control their transconductances to furnish an optimum combination so far as low noise in the output is concerned. And, further, this differential control by means of biases C1 and C2 will have no effect on the signal amplitude produced by identical signals.

If one of the tubes, say T1, receives a better signal than the other tube then the bias applied to T1 will be smaller and tube T1 will draw a large current through the load T11, T21, which will produce a high bias on the other tube. Because of this action a tube receiving a good signal helps to cut off or reduce the noise contributions by the tube or tubes in branches receiving poor signals.

The signal channels impressing the signals S1 and S2 on the combining circuit are preferably balanced initially so as to make the signals substantially equal. However, in cases where the equipment is required to operate without attention over long periods of time, during which time changes may occur due to ageing and other secular causes, an unbalance will be produced. This unbalance will produce distortion which may reach intolerable limits.

Figure 4:
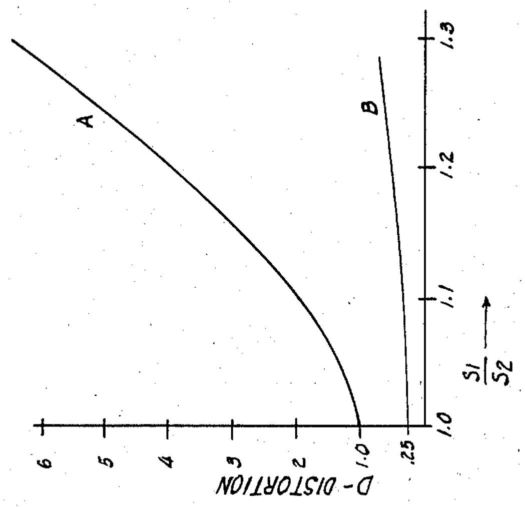
Fig. 4 is a graph which shows the superior results obtained with the combining circuit of the present invention.

The improvements produced by the application of negative feedback to the combining circuit is illustrated in Fig. 4. The ordinate of the graph is the distortion, D, of the signal measured in arbitrary units, which may be percentages, for example, and the abscissa is the ratio of S1 to S2, which are the signals applied to the grids 19 and 29 of tubes T1 and T2. The manner in which the distortion increases as the unbalance increases, that is, as the ratio of S1 to S2 increases, is indicated by the curve A of Fig. 4, for the case where the load for the tubes T1 and T2 is a common passive resistor, such as the resistor 35 of my application Ser. No. 517,851. The curve A shows that for a ratio of S1 to S2 equal to unity, there may be, for example, one unit of distortion. When, due to ageing or other causes, the signal ratio has become 1.1 to 1, the distortion will generally be not less than two units and when the signal ratio is 1.2 to 1, the distortion will not generally be less than four units. It should be noted that the curve A is a graph of the relationship between signal distortion and a ratio between two signals which is always nearly unity. Curve A is drawn for the case where the bias voltages C1 and C2 are equal.

The curve B in Fig. 4 shows the result of the present combining circuits. When the ratio of S1 to S2 is unity, a reduction in the distortion is obtained due to the application of the negative feedback to the individual branches of the combining circuit. Let it be assumed that the feedback is such that the distortion is reduced to one fourth of its original value. Now, when a progressive imbalance or inequality of S1 and S2 occurs, the resultant output distortion will always be less than one-fourth of the original value, if it rises at all, and the improved result will be such as indicated by the curve B. It is known from experiment that the curve B has a linearity which is not to be expected merely from the application of negative feedback to the individual branches of the combining circuit. The application of negative feedback in the manner shown not only improves the operation of the individual branches of the combining circuit, but improves the linearity of the joint combining action of the two branches.

For the sake of simplicity the invention has been exemplified by only one embodiment thereof, but it will be evident to those skilled in the art that many modifications and variations of the illustrated embodiment of the invention can be made within the spirit and scope of the invention as defined in the following claims.

I claim:

1. A diversity receiving system comprising a plurality of radio frequency receiving means for normally producing substantially equal demodulated signal outputs and demodulated noise outputs which vary inversely with the amplitudes of the respective radio frequency inputs, a noise channel connected to the output of each receiving means, each noise channel including means for selecting noise voltages only, means in each channel for rectifying said noise voltages to produce a biasing voltage, a combining circuit comprising a plurality of first electron tubes each having control electrode means and a load impedance connected to said electron tubes, said load impedance comprising a plurality of second electron tubes connected in series with said first electron tubes, means for impressing a portion of the output of each of said first electron tubes on the control electrode of one of said second electron tubes, means for impressing the biasing voltage and the signal and noise outputs of each receiving means on the control electrode means of one of the first electron tubes and means for obtaining an output signal voltage from said load impedance.

2. A system according to claim 1, wherein the noise channel connected to each receiving means comprises an electron tube circuit connected to the output of said receiving means, a high pass filter connected to the electron tube circuit and having a cut-off frequency which is higher than the highest useful signal frequency, the rectifying means in each noise channel being poled so as to impress a negative biasing potential on the control electrode connected thereto.

3. A system according to claim 1 wherein each of said receiving means includes an automatic gain control circuit.

4. A diversity receiving system according to claim 1, wherein said receiving means are spaced frequency modulation receivers.

5. A diversity receiving system comprising a plurality of frequency modulation receivers, means for additively combining the demodulated signal outputs of said receivers comprising a plurality of first electron tubes each having an impedance connected to its anode and a control electrode connected to the output of each receiver, a load impedance circuit including a plurality of second electron tubes having their anodes connected in common to the cathodes of all said first electron tubes, means for deriving an output from said load impedance, and a separate negative feedback circuit connection from the anodes of each of said first electron tubes to a control electrode of one of said second electron tubes.

6. A system according to claim 5, including means for varying the transconductance of each of said first electron tubes in accordance with the average amplitude of the radio frequency input to the receiver connected to that tube.

7. A system according to claim 5, including means for varying the transconductance of each of said first electron tubes inversely in accordance with the average noise output of the receiver connected thereto.

8. A system according to claim 5, including means connected between each receiver and the first electron tube connected thereto for filtering out a demodulated noise component only from the output of said receiver, means connected to said filtering means for deriving a rectified voltage from said noise component, and means for biasing that first electron tube with said rectified voltage.

9. A combining circuit for a diversity receiving system comprising a plurality of first electron tubes each having a control electrode for receiving an input signal, a plurality of second electron tubes each connected in series with one of said first electron tubes, each of said second electron tubes having a control electrode, means for impressing a portion of the output of each first electron tube degeneratively on the control electrode of the corresponding second electron tube, and means for obtaining an output signal from said second electron tubes.

10. A circuit according to claim 9, including a load resistor connected to the anode of each of said first electron tubes and an alternating current connection from the anode of each first electron tube to the control electrode of the corresponding second electron tube.

11. A circuit according to claim 9, including means for directly interconnecting the anodes of said second electron tubes.

12. A diversity receiving system comprising a plurality of frequency modulation receivers, a plurality of first electron tubes each connected to the output of each receiver, a load impedance connected to the cathodes of all of said electron tubes, means including said electron tubes for producing the combined modulation frequency signal output of all said receivers across said load impedance, and means for varying the value of said load impedance in response to the output of said receivers.

13. A diversity receiving system according to claim 12, including means connecting a control electrode of each electron tube to the output of one of said receivers for impressing the demodulated signal output of the receiver on the control electrode, a second electron tube connected in series with each of said first electron tubes with the anode of the second tube connected to the cathode of the first tube, means for degeneratively interconnecting each of said first electron tubes with the corresponding second electron tube and means for obtaining the additively combined demodulated signals from said second electron tube.

14. A diversity receiving system according to claim 13, wherein the anodes of said second tubes are directly connected together and the means for obtaining the output signal includes a connection to the anodes of the second tubes.

15. A diversity receiving system according to claim 14, including means for producing self bias for each of said second electron tubes.

References Cited in the file of this patent

UNITED STATES PATENTS

| | | |
|---|---|---|
| 2,384,456 | Davey | Sept. 11, 1945 |
| 2,428,295 | Scantlebury | Sept. 30, 1947 |
| 2,488,193 | Huges | Nov. 15, 1949 |
| 2,511,015 | Schultz | June 13, 1950 |
| 2,631,198 | Parisoe | Mar. 10, 1953 |
| 2,644,885 | Atwood | July 7, 1953 |
| 2,679,029 | Jose | May 18, 1954 |
| 2,689,886 | Cooper | Sept. 21, 1954 |
| 2,740,847 | Cahill | Apr. 3, 1956 |

FOREIGN PATENTS

| | | |
|---|---|---|
| 577,247 | Great Britain | May 10, 1946 |